(12) United States Patent
Yonezawa (10) Patent No.: US 9,998,201 B2
(45) Date of Patent: Jun. 12, 2018

(54) BATTERY POWERED WIRELESS RELAY SWITCHING TO ROUTING STATE ON THE BASIS OF SIGNAL INTENSITY

(71) Applicant: Yokogawa Electric Corporation, Musashino-shi, Tokyo (JP)

(72) Inventor: Masaaki Yonezawa, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days. days.

(21) Appl. No.: 14/889,996

(22) PCT Filed: Apr. 14, 2014

(86) PCT No.: PCT/JP2014/060573
§ 371 (c)(1),
(2) Date: Nov. 9, 2015

(87) PCT Pub. No.: WO2014/185203
PCT Pub. Date: Nov. 20, 2014

(65) Prior Publication Data
US 2016/0127031 A1  May 5, 2016

(30) Foreign Application Priority Data

May 13, 2013 (JP) .................................. 2013-100836

(51) Int. Cl.
*H04B 7/15* (2006.01)
*H04B 7/155* (2006.01)

(52) U.S. Cl.
CPC ....... *H04B 7/1555* (2013.01); *H04B 7/15507* (2013.01); *Y02D 70/00* (2018.01); *Y02D 70/144* (2018.01); *Y02D 70/446* (2018.01)

(58) Field of Classification Search
CPC .. H04W 88/04; H04W 16/26; H04B 7/15557; H04B 7/14; H04B 7/15; H04B 7/15528
(Continued)

(56) References Cited

U.S. PATENT DOCUMENTS

| 7,565,106 B1 | 7/2009 | Oh et al. |
| 2004/0110469 A1* | 6/2004 | Judd ...................... G01S 19/25 455/15 |

(Continued)

FOREIGN PATENT DOCUMENTS

| JP | 56-119541 A | 9/1981 |
| JP | 2002-368665 A | 12/2002 |

(Continued)

OTHER PUBLICATIONS

Communication dated May 13, 2014 issued in International Application No. PCT/JP2014/060573 (PCT/ISA/210/237).

(Continued)

*Primary Examiner* — Philip Sobutka
(74) *Attorney, Agent, or Firm* — Sughrue Mion, PLLC (57) ABSTRACT

It is to realize a field wireless relay device which can extend a life of a battery as compared to the prior art. A field wireless relay device configured to be driven by a battery and having a communication relay unit, the communication relay unit having a receiving and transmitting function of amplifying again and transmitting a received signal of wireless communication performed between a transmitting station and a receiving station through an antenna and a routing function of designating a communication path of the wireless communication, the field wireless relay device comprises an antenna control unit configured to control a connected antenna system, and an antenna control decision unit configured to decide a type of control to be performed by the antenna control unit on the basis of a signal intensity of the received signal to be relayed.

9 Claims, 8 Drawing Sheets

(58) Field of Classification Search
USPC .................. 455/11.1, 7, 20, 21, 22, 23, 25
See application file for complete search history.

(56) References Cited

U.S. PATENT DOCUMENTS

2010/0297937 A1* 11/2010 Kim .................... H04B 7/1555
455/11.1
2012/0099490 A1* 4/2012 Kummetz .......... H04B 7/15535
370/280

FOREIGN PATENT DOCUMENTS

| JP | 2005-252938 A | 9/2005 |
| JP | 2006-39892 A | 2/2006 |
| WO | 2008/011336 A2 | 1/2008 |
| WO | 2008/011336 A3 | 1/2008 |

OTHER PUBLICATIONS

Communication dated Dec. 8, 2016, issued by the European Patent Office in counterpart European Patent Application No. 14797676.5.

\* cited by examiner

BATTERY POWERED WIRELESS RELAY SWITCHING TO ROUTING STATE ON THE BASIS OF SIGNAL INTENSITY

This is a National Stage of International Application No. PCT/JP2014/060573 filed Apr. 14, 2014, claiming priority based on Japanese Patent Application No. 2013-100836 filed May 13, 2013, the contents of all of which are incorporated herein by reference in their entirety.

TECHNICAL FIELD

The present invention relates to a field wireless relay device and in particular to improvement of power consumption of a field wireless relay device driven by a battery.

BACKGROUND ART

Figure 7:
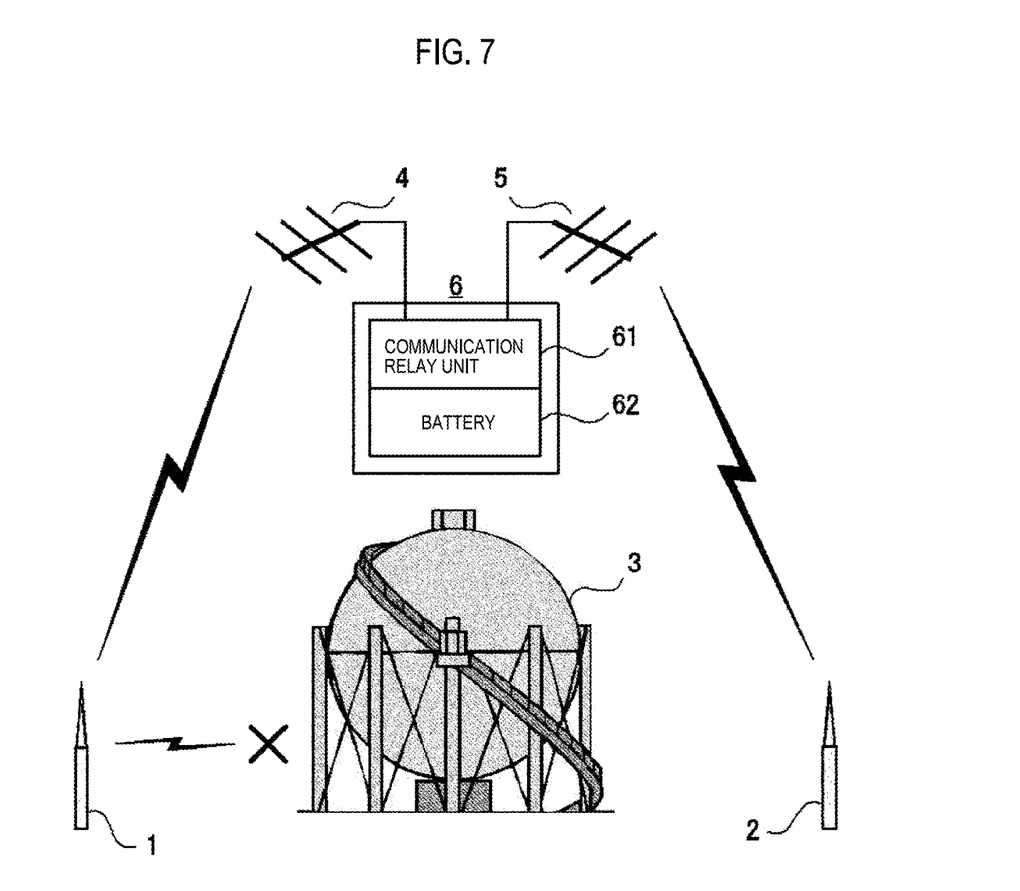
FIG. 7 is a configuration explanatory view showing an example of a field wireless relay system which has been conventionally used.

FIG. 7 is a configuration explanatory view showing an example of a field wireless system which has been conventionally used. In FIG. 7, an antenna 1 is installed in a field wireless device, not shown, serving as a transmitting station and an antenna 2 is installed in a field wireless device, not shown, serving as a receiving station. The antennas 1 and 2 are installed to face each other across a tank 3. The field wireless devices, not shown, are driven by a battery and are configured to send and receive various data to and from each other by an line-of-sight low power wireless communication through the antennas 1 and 2.

However, because the tank 3 becomes an obstacle to the line-of-sight wireless communication in such a state, it is difficult to perform the line-of-sight low power wireless communication between the transmitting station and the receiving station.

Thus, antennas 4 and 5 having directionality are installed in the vicinity of the top portion of the tank 3, at which the antennas 1 and 2 can be looked down, and also a field wireless device 6 driven by a battery is installed to be connected with the antennas 4 and 5 and thus to serve as a relay station. Accordingly, the relay station performs an line-of-sight wireless communication with the transmitting station through the antennas 1 and 4 and also performs an line-of-sight wireless communication with the receiving station through the antennas 2 and 5.

Such a field wireless device 6 serving as the relay station is equipped with a communication relay unit 61, which has a receiving and transmitting function of amplifying a received signal again and then transmitting the signal after adding its own communication data thereto as needed and a routing function of designating a communication path, and a driving battery 62. Hereinafter, this is referred to as a router 6.

However, the router 6 needs to receive and retransmit communication data of other field wireless devices serving as the transmitting station and the receiving station, in addition to its own communication data, and accordingly consumes a large amount of electric power for wirelessly receiving and transmitting and for data processing.

Thus, the battery life of the router 6 is generally shortened as compared to the other field wireless devices and is likely to be about a fraction of the other field wireless device depending on conditions. If the battery life of the router 6 runs out to stop operation of the router 6, receiving and retransmitting of communication data from and to the other field wireless devices as described above are impossible so that the communication path of the field wireless system cannot be constructed.

As a result, an operable period of the field wireless system is determined by the battery life of the router 6, and, as described above, the period is shorter than battery lives of the other wireless devices and in some cases, is limited to a fraction of the battery lives.

Even though the battery lives of the other field wireless devices are remained, a battery replacement work of the router 6 is required. In this case, the function of the router 6 has to be temporarily paused due to the battery replacement, thereby causing an influence on the communication function of the system.

As a measure for avoiding this problem, a measure in which a large capacity battery is mounted in only the router 6 is conceived, but there is a problem that in addition to increase in size or weight of the battery, costs thereof is increased.

Also, because the field wireless device as the router 6 becomes different from field wireless devices, which do not have the routing function, in terms of configurations, a field wireless device placed in a field cannot be flexibly used in such a manner that depending on situations, a function setting thereof is changed over into a router or a field wireless device, which does not have the routing function.

Figure 8:
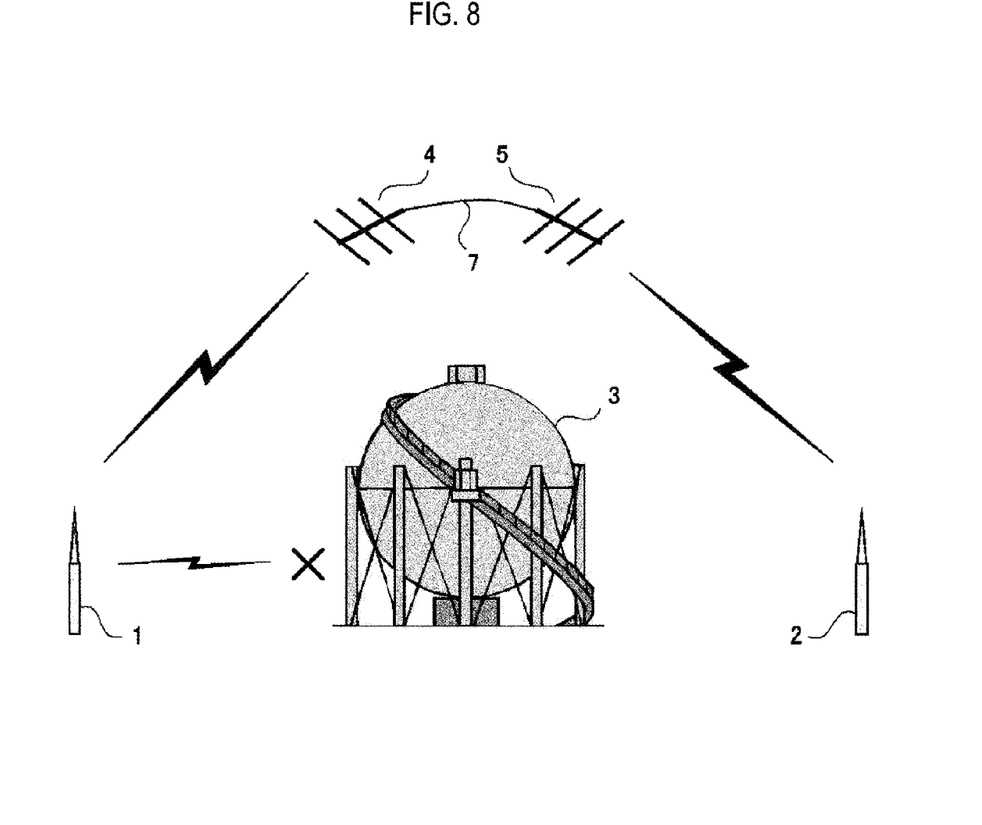
FIG. 8 is a block diagram showing an example of a passive repeater used as a relay device which does not requires a power supply.

FIG. 8 is a block diagram showing an example of a passive repeater used as a relay device which does not requires a power supply, wherein the same parts as those in FIG. 7 are designated by the same reference numerals.

As shown in FIG. 8, the passive repeater is configured to connect antennas 4 and 5 via a high frequency cable. 7. For example, radio waves absorbed by one antenna 4 are guided to the other antenna 5 via the high frequency cable 7, where the radio waves are reradiated. This action is valid in both directions.

If the passive repeater is installed for example in the vicinity of the top portion of a tank 3, an influence of the tank 3 on wireless communication between a transmitting station, which is connected with the antenna 1, and a receiving station, which is connected with the antenna 2, arranged to face each other across the tank 3 is reduced because radio waves transmitted from the antenna 1 of one station (e.g., transmitting station) are absorbed by one antenna (e.g., 4), reradiated from the other antenna (e.g., 5) and then received by the antenna 2 of the other station (e.g., receiving station) so that the radio waves are substantially relayed.

In Patent Document 1, a passive antenna type communication system technique is disclosed in which even at locations where data transmission by wireless communication is impossible, the communication is enabled without modifying wireless devices, thereby allowing field data to be monitored and controlled by a center apparatus, a mobile terminal and the like.

Also, in Patent Document 2, a technique is disclosed which can easily convert a previously installed field device into a wireless type.

CITATION LIST

Patent Document

Patent Document 1: JP 2002-368665 A
Patent Document 1: JP 2006-39892 A

SUMMARY OF INVENTION

Technical Problem

However, the passive repeater has the following problems.

As considered in a device receiving a relayed radio data, a signal intensity of a received signal is weak as compared to the router 6. The router 6 retransmits a receive signal after first electrically amplifying the signal, whereas the passive repeater does not have such an amplification function.

In addition, the passive repeater receives and relays even unintended radio waves. In order to accommodate a number of terminals in the system, a set of a plurality of transmitting stations and receiving stations which are not interference with each other has to simultaneously use the same radio frequency, but the passive repeater is always operated. Also, antennas respond to all radio waves within a frequency range capable of receiving and transmitting. Accordingly, because unintended radio waves are relayed, there is a possibility that interference disturbance is increased as considered on a receiving side.

The present invention is directed to solve the above problems, and an object thereof is to realize a field wireless relay device which can extend a life of a battery relative to conventional cases.

Solution to Problem

The object of the present invention is achieved by the following configurations.

(1) A field wireless relay device configured to be driven by a batter and having a communication relay unit, the communication relay unit having a receiving and transmitting function of amplifying again and transmitting a received signal of wireless communication performed between a transmitting station and a receiving station through an antenna and a routing function of designating a communication path of the wireless communication, the field wireless relay device comprises:

an antenna control unit configured to control a connected antenna system; and an antenna control decision unit configured to decide a type of control to be performed by the antenna control unit on the basis of a signal intensity of the received signal to be relayed.

(2) In the field wireless relay device according to (1), the connected antenna system comprises dual systems for receiving and transmitting, and on the basis of the decision result of the antenna control decision unit, the antenna control unit is set to a router mode, in which a receiving antenna system is connected to a receiving section of the communication relay unit and a transmitting antenna system is connected to a transmitting section of the communication relay unit, or a passive repeater mode, in which the receiving antenna system and the transmitting antenna system are directly connected to each other.

(3) In the field wireless relay device according to (2), each antenna has directionality.

(4) In the field wireless relay device according to (1), the connected antenna system comprises a single system shared for receiving and transmitting, and on the basis of the decision result of the antenna control decision unit, the antenna control unit rotates a main body of the antenna of the shared single system about a mounting axis thereof to maximize a signal intensity of the received signal to be relayed.

(5) In the field wireless relay device according to (4), the antenna has non-directionality.

Advantageous Effects of Invention

According to the field wireless relay device of the present invention, the field wireless relay device can be changed over into a router mode or a passive repeater mod depending on a received signal intensity in a receiving station, thereby extending a life of a battery as compared to a case where the device is always operated in the router mode.

DESCRIPTION OF EMBODIMENTS

Figure 1:
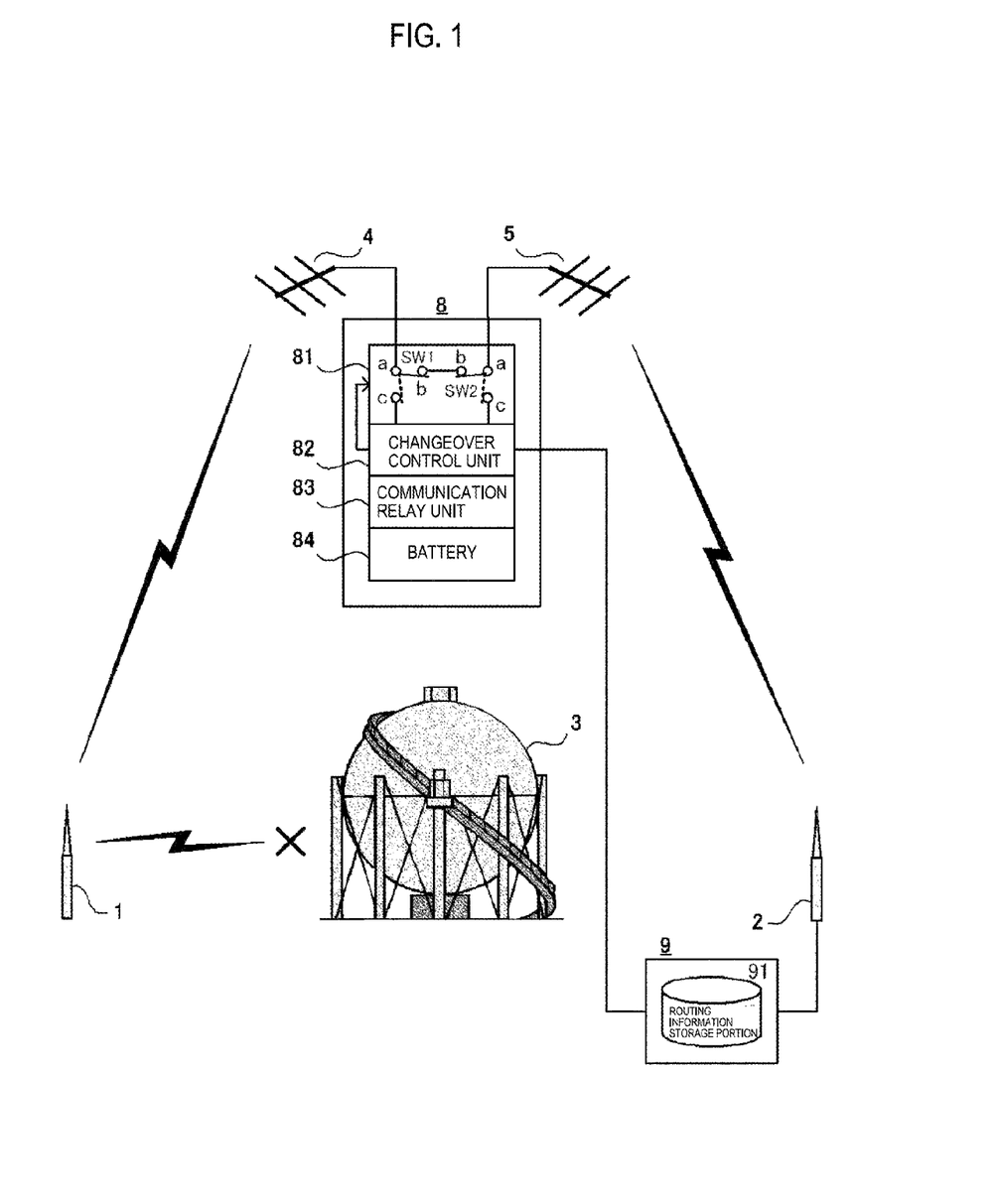
FIG. 1 is a block diagram showing an embodiment of the present invention.

FIG. 1 is a block diagram showing an embodiment of the present invention, wherein the same parts as those in FIG. 7 are designated by the same reference numerals.

In FIG. 1, a field wireless relay device (hereinafter, referred to as a router) 8, which serves as a router, is equipped with an antenna changeover unit 81, a changeover control unit 82, a communication relay unit 83 and a battery 84.

A system management unit 9 is connected to an antenna 2 equipped in a field wireless device, not shown, serving as a receiving station. The system management unit 9 is equipped with a routing information storage portion 91 for storing routing information including communication path information for wireless communication.

The antenna changeover unit 81 is constituted of two changeover switches SW1 and SW2, which are driven to be changed over in conjunction with each other, and changes over a receiving antenna system, for example, an antenna 4 and a transmitting antenna system, for example, an antenna 5, into a "passive repeater mode", in which the antennas 4 and 5 are directly connected to each other, or into a "router mode", in which the antennas 4 and 5 are connected via the communication relay unit 83, on the basis of a changeover instruction from the changeover control unit 82.

In the antenna changeover unit 81, a movable contact a of the switch SW1 is connected to the antenna 4 and a movable contact a of the switch SW2 is connected to the antenna 5. One fixed contact b of the switch SW1 and one fixed contact b of the switch SW2 are directly connected to each other, and the other fixed contact c of the switch SW1 and the other fixed contact c of the switch SW2 each are connected to the changeover control unit 82. The changeover control unit 82 includes an antenna control unit for controlling a connected antenna system, and an antenna control decision unit for deciding a type of control to be performed by the antenna control unit on the basis of a signal intensity of a received signal to be relayed according to the present invention.

The changeover control unit 82 receives routing information from the system management unit 9, decides whether or not a current information to be relayed can be received at a sufficient signal intensity by the receiving station even if being directly relayed from an antenna 1 of the transmitting station to the antenna 2 of the receiving station in the passive repeater mode or whether or not the information needs to be relayed in the router mode in which the information is amplified again and transmitted after being received, and outputs the decision result to the antenna changeover unit 81.

On the other hand, if information to be relayed does not exist, both relay operations in the passive mode and the router mode as well as operations of the communication relay unit 83 as described below are not performed.

If information to be relayed exists, the communication relay unit 83 amplifies information received by one antenna, for example, the antenna 4, and then transmits the information to the other antenna, for example, the antenna 5. If information to be relayed does not exist, transmission is not performed.

The battery 84 supplies driving electric powers to the antenna changeover unit 81, the changeover control unit 82 and the communication relay unit 83.

Operations of the router 8 configured as in FIG. 1 will be described focusing on operations of the changeover control unit 82.

1) If information to be relayed exists, the changeover control unit 82 turns the movable contacts a of the changeover switches SW1 and SW2 toward the respective fixed contact b as shown in solid lines, thereby relaying the information to be relayed in the passive mode as described above. Thus, a transmitted signal from the antenna 1 of the transmitting station, which is received by the antenna 4, is sent to the antenna 5 without any change, and then a transmitted signal from the antenna 5 is received by the antenna 2 of the receiving station.

2) The system management unit 9 of the receiving station connected to the antenna 2 measures a received signal intensity of the information to be relayed, which is relayed in the passive mode, and then outputs the measurement result to the changeover control unit 82 of the router 8.

3) Next, the changeover control unit 82 turns the movable contacts a of the changeover switches SW1 and SW2 toward the respective fixed contact c as shown in broken lines, thereby relaying the information to be relayed in the router mode as described above. Thus, a transmitted signal from the antenna 1 of the transmitting station, which is received by the antenna 4, is amplified again by the communication relay unit 83 and then sent to the antenna 5 after adding communication data of the router 8 itself thereto as needed. A transmitted signal from the antenna 5 is received by the antenna 2 of the receiving station.

4) The system management unit 9 of the receiving station connected to the antenna 2 measures a received signal intensity of the information to be relayed, which is relayed in the router mode, and then outputs the measurement result to the changeover control unit 82 of the router 8.

5) The changeover control unit 82 of the router 8 compares and evaluates the received signal intensity measured in the passive mode and the received signal intensity measured in the router mode.

Specifically, if the received signal intensity in the passive mode is a level at which it can be decided that communication between wireless field devices can be established, the changeover control unit 82 selects the passive mode as the relaying mode for the purpose of maximizing a life of the battery 84.

Figure 2:
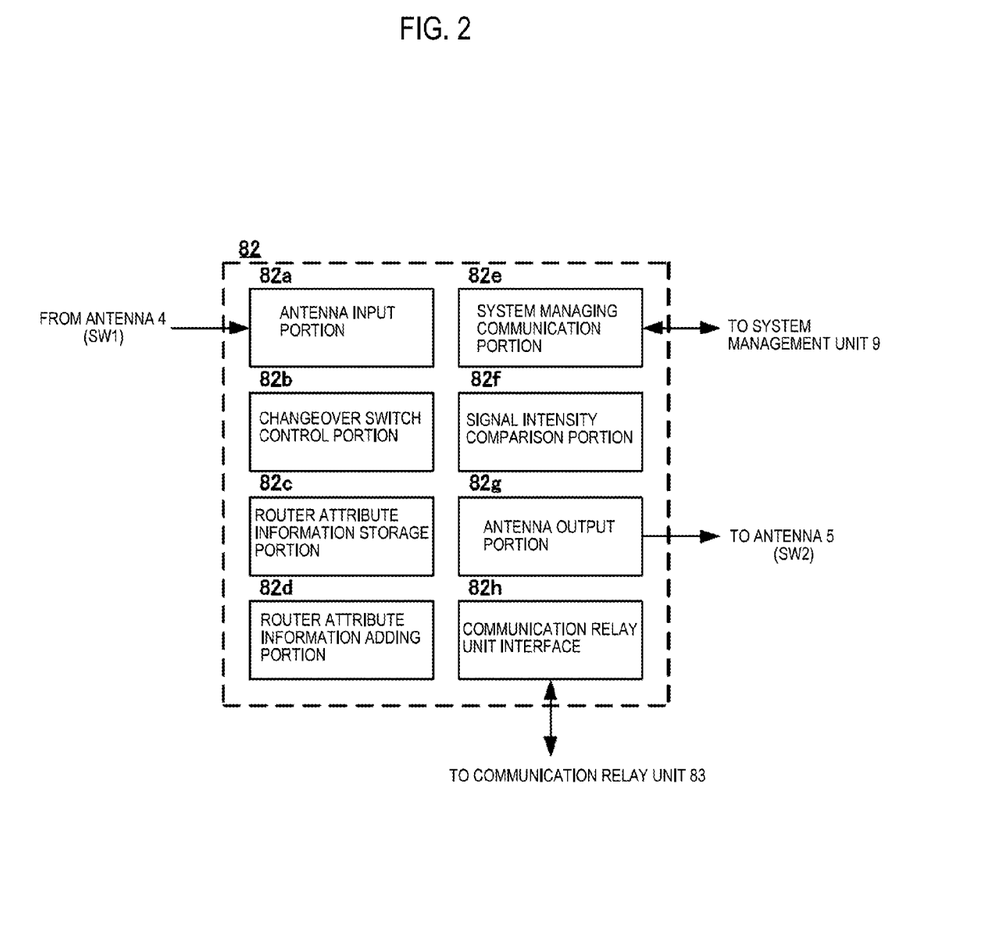
FIG. 2 is a block diagram showing a detailed configuration example of a changeover control unit 82.

FIG. 2 is a block diagram showing a detailed configuration example of the changeover control unit 82. The antenna 4 is connected to an antenna input portion 82*a* via the changeover switch SW1. A changeover switch control portion 82*b* creates and outputs a control signal for driving two changeover switches SW1 and SW2, which constitute the antenna changeover unit 81, so that they are changed over in conjunction with each other.

In a router attribute information storage portion 82*c*, an inherent identification code assigned to the router 8, routing information for designating a communication path for wireless communication of information to be relayed and the like are stored. A router attribute information adding portion 82*d* adds a predetermined router attribute information to the information to be relayed and outputted in the router mode as needed.

A system managing communication portion 82*e* sends and receives various information, including a received signal intensity of the information to be relayed, to and from the system management unit 9 of the receiving station equipped with the antenna 2. A signal intensity comparison portion 82*f* compares a received signal intensity of the information to be relayed in the passive mode with a received signal intensity thereof in the router mode, decides which of the passive mode and the router mode has to be selected, and then outputs the decision result to a changeover switch control portion 82*b*.

The antenna 5 is connected to an antenna output portion 82*g* via the changeover switch SW2. A communication relay unit interface 82*h* performs sending and receiving of various information between the changeover control unit 82 and the communication relay unit 83.

Figure 3:
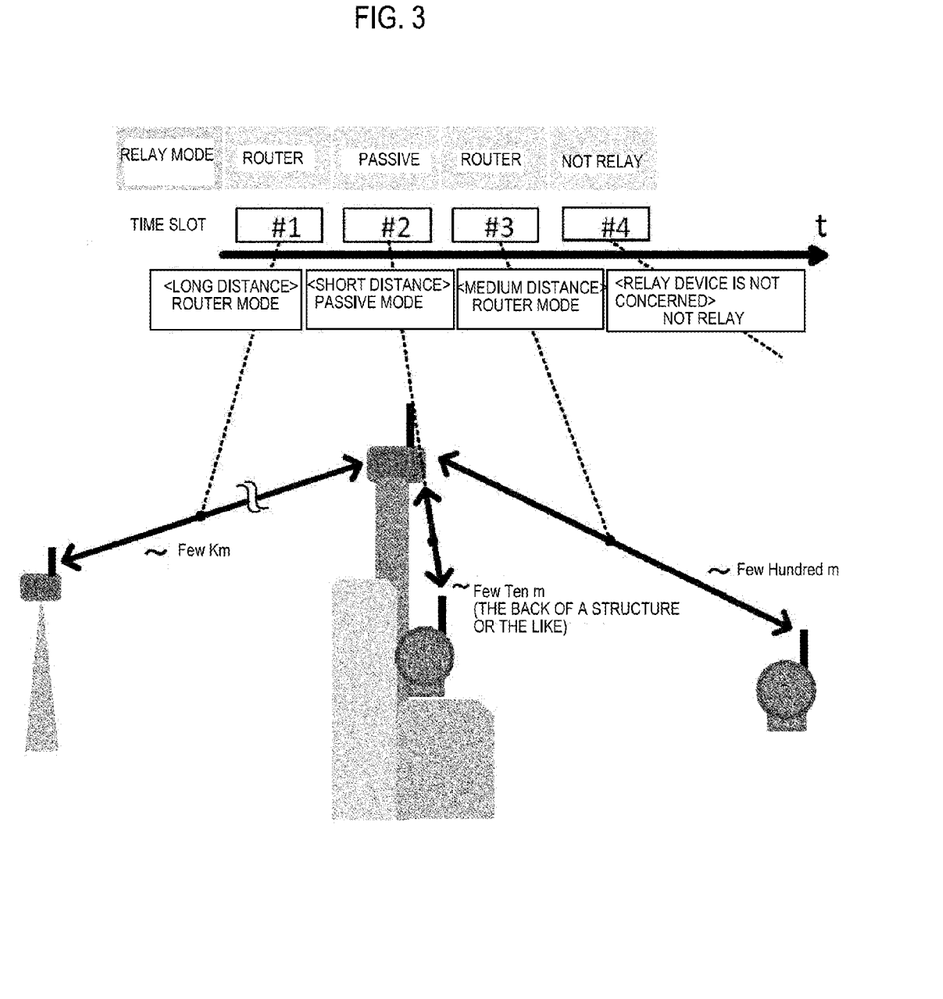
FIG. 3 is a timing chart explaining an operation example of the present invention.

FIG. 3 is a timing chart explaining an operation example of the present invention, in which a relationship of a length of a distance between a relay device and a field device, which is the transmitting station or the receiving station, to an operation mode of the relay device is illustrated as an example of a time-division multiplexing system in which a time slot is assigned at every transmitting and receiving pair of wireless communication so that changeover of the operation mode is performed.

A time slot #1 is a case where a communication distance thereof is a long distance of few kilometers, and the relay device is operated in the router mode. A time slot #2 is a case where a communication distance thereof is a short distance of few ten meters, such as the back of a structure, and the relay device is operated in the passive mode. A time slot #3 is a case where a communication distance thereof is a medium distance of few hundred meters, and the relay device is operated in the router mode. A time slot #4 is a case where the relay device is not concerned, and thus the relaying operation is not performed at all.

As described above, because relaying is performed in the passive repeater mode when amplification and retransmission of received data are not required, the battery is not needlessly spent, thereby extending a life of the battery.

If a signal intensity in the receiving station is insufficient, relaying can be changed over from the passive repeater operation to the router operation. Accordingly, as compared to a case where only a passive repeater is installed, a range over which the relaying service can be provided is widened.

Also, because the passive repeater function can be operated only at a necessary timing, the probability of occurring extra interference disturbance is decreased.

In addition, even if the battery of the router is ended and thus the router function is stopped, the passive repeater function is still operated to remain a minimal relaying function, thereby enhancing robustness for a relay device.

Meanwhile, although the example of having two antennas is described in the foregoing embodiment, three or more antennas may be employed.

Figure 4:
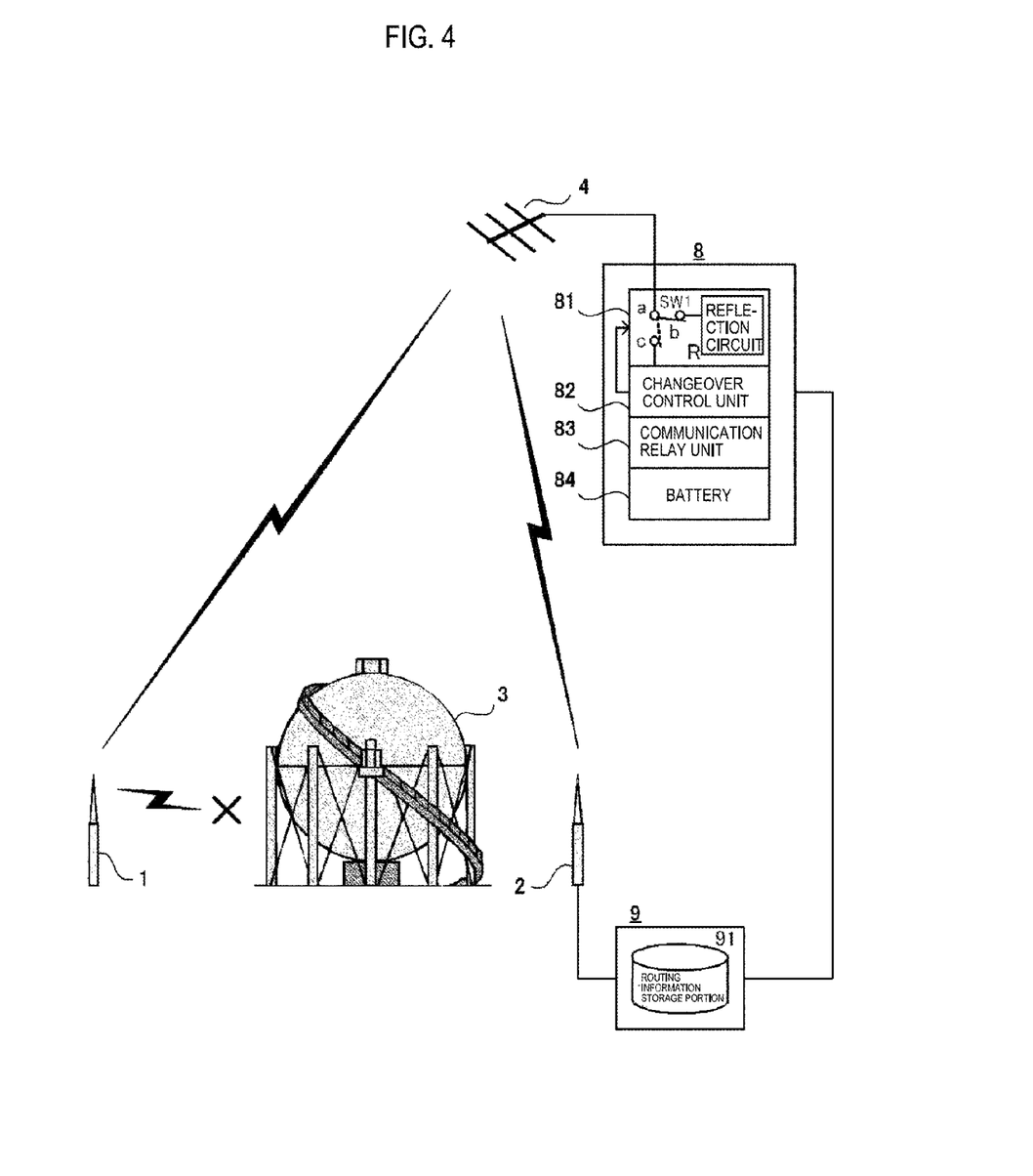
FIG. 4 is a block diagram showing another embodiment of the present invention.

Also, one antenna may be employed, and even if one antenna is employed, the passive repeater can be constructed as shown in FIG. 4. In FIG. 4, instead of the switch SW2 of the antenna changeover unit 81 of FIG. 1, a reflection circuit R is installed in the fixed contact b of the switch SW1.

The reflection circuit R is intended to totally reflect a high frequency signal inputted thereto, and a releasing circuit or the like is properly used as a total reflection means.

The antenna changeover unit 81 selects whether to connect the antenna 4 to the reflection circuit R or to connect the antenna 4 to the routing system depending on instructions from the changeover control unit 82. Herein, the state where the antenna 4 is connected to the reflection circuit R is referred to as a passive repeater mode, and the state where the antenna 4 is connected to the routing system is referred to as a router mode.

The changeover control unit 82 obtains routing information from the system management unit 9 to decide whether or not information to be relayed currently can be received at a sufficient signal intensity by the receiving station even if being relayed in the passive repeater mode or whether or not the information needs to be relayed in the router mode, and also instructs changeover to the antenna changeover unit 81.

If information to be relayed currently exists, information received through the antenna 4 is accumulated and amplified, and then retransmitted through the antenna 4. If information to be relayed does not exist, relaying operation is not performed in either function of the passive mode and the router mode.

Meanwhile, the antenna 4 of FIG. 4 is a single system shared for receiving and transmitting, and the antenna control portion incorporated in the changeover control unit 82 may rotate a main body of the antenna 4 about a mounting axis thereof to maximize a signal intensity of a received signal to be relayed on the basis of the decision result of the antenna control decision unit.

Also, a function of controlling a transmission power upon relaying may be provided to extend the life of the battery 84 in the router mode. In the case where the time-division multiplexing system is employed, the transmission power is also controlled at every time slot, for example, as shown in FIG. 5.

Figure 5:
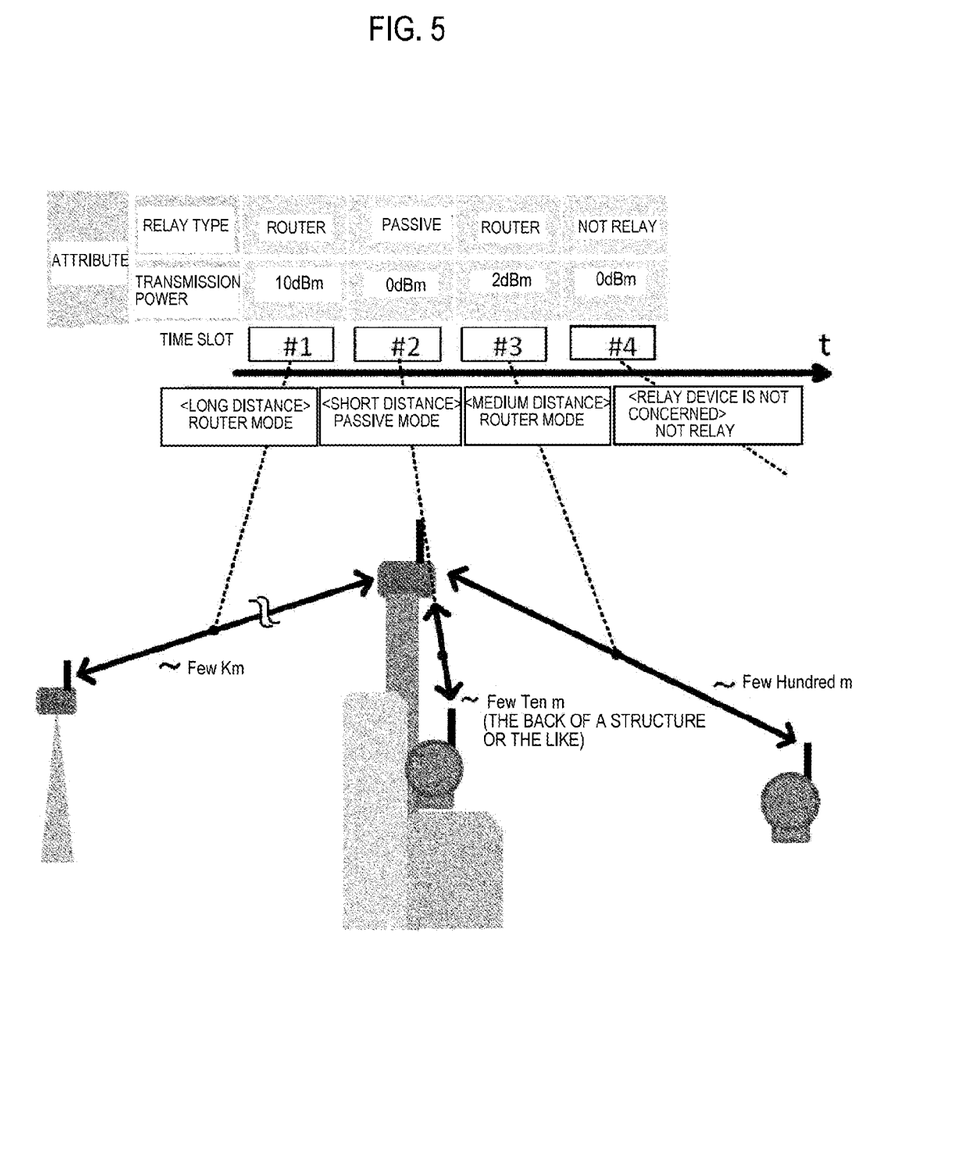
FIG. 5 is a timing chart explaining another operation example of the present invention.

In FIG. 5, a time slot #1 is a case where a communication distance thereof is a long distance of few kilometers, and thus the transmission power is set, for example, to 10 dBm and the relay device is operated in the router mode.

A time slot #2 is a case where a communication distance thereof is a short distance of few ten meters, such as the back of a structure, and thus the transmission power is set, for example, to 0 dBm and the relay device is operated in the passive mode.

A time slot #3 is a case where a communication distance thereof is a medium distance of few hundred meters, and thus the transmission power is set, for example, to 2 dBm and the relay device is operated in the router mode.

A time slot #4 is a case where the relay device is not concerned, and thus the transmission power is set, for example, to 0 dBm, but the relaying operation is not performed at all.

Also, when wireless communication is performed by an antenna and a communication circuit, which are selected from a plurality of antennas including at least directional antennas and at least one communication circuit and assigned by the control unit on the basis of time slots, the effects that a multi-hop communication using the directional antennas can be realized and also a long distance communication and various communication types can be realized while suppressing increase in costs of the field wireless relay device as far as possible can be also obtained.

Figure 6:
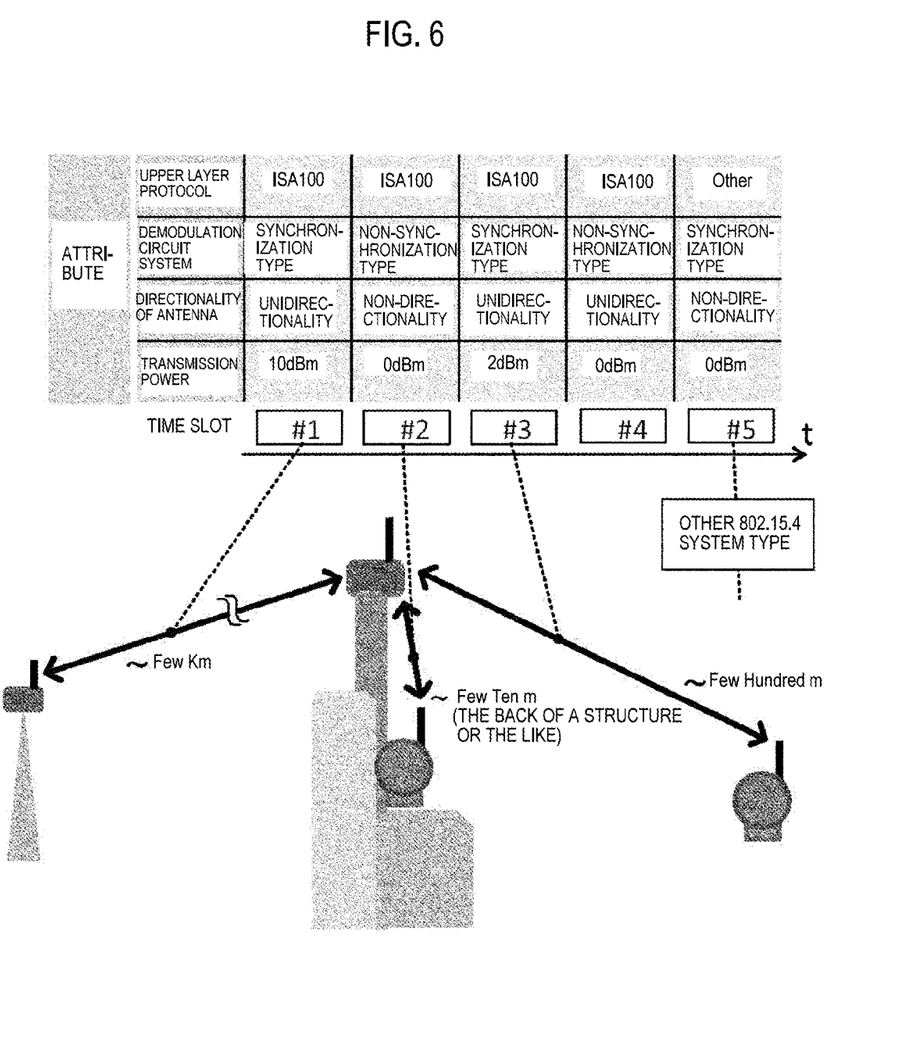
FIG. 6 is a timing chart explaining further another operation example of the present invention.

Also, for example, as shown in FIG. 6, attributes, such as upper layer protocols, demodulation circuit systems, directivities of the antennas, transmission powers and the like, are synchronously changed over at every time slot, so that an optimal communication condition at each time slot can be set depending on communication distance or communication purposes, the life of the battery can be extended, and also a further stabilized communication can be realized.

In FIG. 6, a time slot #1 is set so that the upper layer protocol is ISA100, the demodulation circuit system is a synchronization type, the antenna has unidirectionality and the transmission power is 10 dBm.

A time slot #2 is set so that the upper layer protocol is ISA100, the demodulation circuit system is a non-synchronization type, the antenna has non-directionality and the transmission power is 0 dBm.

A time slot #3 is set so that the upper layer protocol is ISA100, the demodulation circuit system is a synchronization type, the antenna has unidirectionality and the transmission power is 2 dBm.

A time slot #4 is set so that the upper layer protocol is ISA100, the demodulation circuit system is a non-synchronization type, the antenna has unidirectionality and the transmission power is 0 dBm.

Also, a time slot #5 is set so that the upper layer protocol is "802.15.4" but have a system type different from ISA100, the demodulation circuit system is a non-synchronization type, the antenna has non-directionality and the transmission power is 0 dBm.

Meanwhile, attributes, which are to be synchronously changed over at every time slot, are not limited to the example of FIG. 6, and accordingly, antenna gains, modulation systems, relay types and the like may be additionally combined.

As described above, according to the present invention, a field wireless relay device which can extend a life of a battery relative to conventional cases can be realized.

Meanwhile, in the foregoing description, specific preferable embodiments are just described for the purpose of explaining and illustrating the present invention. Accordingly, the present invention is not limited to the foregoing embodiment, but is intended to encompass various changes and modifications thereof without departing from the spirit thereof.

This application is based on Japanese Patent Application No. 2013-100836 filed on May 13, 2013, the entire contents of which are incorporated herein by reference.

REFERENCE NUMERALS LIST 1, 2, 4, 5: Antenna
3: Tank
8: Field wireless device (router)
81: Antenna changeover unit
82: Changeover control unit
82a: Antenna input portion
82b: Changeover switch control portion
82c: Router attribute information storage portion
82d: Router attribute information adding portion
82e: System managing communication portion 82*f*: Signal intensity comparison portion
82*g*: Antenna input output portion
82*h*: Communication relay unit interface
83: Communication relay unit
84: Battery
9: System management unit
91: Routing information storage portion

The invention claimed is:

1. A field wireless relay device configured to be driven by a battery and having a communication relay unit, the communication relay unit having a receiving and transmitting function of amplifying again and transmitting a received signal of wireless communication performed between a transmitting station and a receiving station through an antenna and a routing function of designating a communication path of the wireless communication, the field wireless relay device comprising:
   an antenna control unit configured to control a connected antenna system; and
   an antenna control decision unit configured to decide a type of control to be performed by the antenna control unit on the basis of a measurement result of a signal intensity of the received signal to be relayed, the measurement result being measured and output by the receiving station to the field wireless relay device,
   wherein, when the signal intensity of the received signal is large, the antenna control unit sets the antenna system into a passive repeater mode, and
   wherein, when the signal intensity of the received signal is small, the antenna control unit sets the antenna system into a router mode.

2. The field wireless relay device according to claim 1, wherein the connected antenna system comprises dual systems for receiving and transmitting;
   wherein on the basis of the decision result of the antenna control decision unit, the antenna control unit is set to the router mode, in which a receiving antenna system is connected to a receiving section of the communication relay unit and a transmitting antenna system is connected to a transmitting section of the communication relay unit, or the passive repeater mode, in which the receiving antenna system and the transmitting antenna system are directly connected to each other.

3. The field wireless relay device according to claim 2, wherein each antenna has directionality.

4. The field wireless relay device according to claim 1, wherein the connected antenna system comprises a single system shared for receiving and transmitting,
   wherein on the basis of the decision result of the antenna control decision unit, the antenna control unit rotates a main body of the antenna of the shared single system about a mounting axis thereof to maximize a signal intensity of the received signal to be relayed.

5. The field wireless relay device according to claim 1, wherein the connected antenna system comprises a single system shared for receiving and transmitting and has non-directionality.

6. The field wireless relay device according to claim 1, wherein the antenna system, in response to the battery no longer driving the field wireless relay device, operates in the passive repeater mode.

7. The field wireless relay device according to claim 1, wherein when the routing function stops, the antenna system operates in the passive repeater mode.

8. The field wireless relay device according to claim 1,
   wherein the antenna control unit changes an operation mode for each time slot in a time-division multiplexing system in which a time slot is assigned to each pair of a transmitting station and a receiving station, the operation mode being one of the passive repeater mode and the router mode.

9. The field wireless relay device according to claim 1, further comprising:
   a transmission power control unit configured to control a transmission power in relaying in the router mode.

* * * * *